United States Patent
Ahn et al.

(10) Patent No.: US 10,574,941 B2
(45) Date of Patent: Feb. 25, 2020

(54) TERMINAL AND SERVER FOR PROVIDING VIDEO CALL SERVICE

(71) Applicant: HYPERCONNECT, INC., Seoul (KR)

(72) Inventors: Sang Il Ahn, Chungcheongbuk-do (KR); Hyeok Choi, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/223,600

(22) Filed: Dec. 18, 2018

(65) Prior Publication Data

US 2019/0199963 A1 Jun. 27, 2019

(30) Foreign Application Priority Data

Dec. 27, 2017 (KR) .................. 10-2017-0181512

(51) Int. Cl.
*H04N 7/14* (2006.01)
*G06F 3/01* (2006.01)
*G06F 3/0481* (2013.01)
*H04N 5/262* (2006.01)

(52) U.S. Cl.
CPC ............ *H04N 7/147* (2013.01); *G06F 3/017* (2013.01); *G06F 3/04817* (2013.01); *H04N 5/2628* (2013.01)

(58) Field of Classification Search
CPC ...................................................... H04N 7/14
See application file for complete search history.

(56) References Cited

U.S. PATENT DOCUMENTS

| | | | |
|---|---|---|---|
| 6,590,601 | B2 | 7/2003 | Sukeno et al. |
| 8,165,416 | B2 * | 4/2012 | Cutler ................ G06K 9/00362 348/207.11 |
| 8,977,063 | B2 * | 3/2015 | Lee ........................ H04N 7/147 348/14.08 |
| 9,282,287 | B1 | 3/2016 | Marsh |
| 9,848,167 | B1 | 12/2017 | Christian et al. |
| 2003/0091239 | A1 | 5/2003 | Imagawa et al. |
| 2008/0298571 | A1 | 12/2008 | Kurtz et al. |

(Continued)

FOREIGN PATENT DOCUMENTS

| | | |
|---|---|---|
| JP | 2001-309325 A | 11/2001 |
| JP | 2003-219383 A | 7/2003 |

(Continued)

OTHER PUBLICATIONS

Korean Office Action for Application No. 10-2017-0181512, dated Mar. 8, 2019.

(Continued)

*Primary Examiner* — Olisa Anwah
(74) *Attorney, Agent, or Firm* — Marshall, Gerstein & Borun LLP

(57) ABSTRACT

Provided is an application stored in a computer-readable storage medium to perform a method of providing a video call service, the method including, in a first terminal, establishing a video call session between the first terminal and a second terminal; modulating and displaying an area of an image of a second user, except for an exposure area, the image of the second user being displayed in the first terminal; detecting a predetermined event during the video call session; and controlling a size of the exposure area based on the predetermined event.

6 Claims, 12 Drawing Sheets

(56) References Cited

U.S. PATENT DOCUMENTS

| | | | |
|---|---|---|---|
| 2014/0267583 A1* | 9/2014 | Zhu ........................ | H04N 19/21 |
| | | | 348/14.13 |
| 2015/0229882 A1 | 8/2015 | Liu | |
| 2016/0019412 A1* | 1/2016 | Kang ................. | G06K 9/00221 |
| | | | 382/103 |

FOREIGN PATENT DOCUMENTS

| | | |
|---|---|---|
| JP | 2006-270380 A | 10/2006 |
| KR | 10-2011-0025720 A | 3/2011 |

OTHER PUBLICATIONS

European Search Report for Application No. 18213173.0, dated May 7, 2019.
Office Action issued in Japanese Patent Application No. 2018-238541, dated Dec. 10, 2019.

* cited by examiner

# TERMINAL AND SERVER FOR PROVIDING VIDEO CALL SERVICE

CROSS-REFERENCE TO RELATED APPLICATION

This application claims the benefit of Korean Patent Application No. 10-2017-0181512, filed on Dec. 27, 2017, in the Korean Intellectual Property Office, the disclosure of which is incorporated herein in its entirety by reference.

BACKGROUND

1. Field

One or more embodiments relate to a terminal and server for providing a video call service allowing a counterpart's image to be gradually exposed.

2. Description of the Related Art

A video call service allows the counterpart's voice to be output and the counterpart's image to be displayed on a screen during a call. The video call service enables a caller to have a telephone conversation while seeing the image of the counterpart who is in a remote place and enables a caller and a receiver to more easily share their emotions as compared to a voice call.

With the realization of high-speed information and communication and the wide spread of terminals capable of video calling, a video call service has received attention and video call usage has been increasing.

However, despite the convenience of a video call, user's portrait rights and privacy may be violated since a user and the user's surroundings are involuntarily exposed directly to the counterpart at enhanced image quality.

SUMMARY

One or more embodiments include a method, server, and terminal for providing a video call service capable of exposing a user and surroundings according to an event generated during the video call service.

Additional aspects will be set forth in part in the description which follows and, in part, will be apparent from the description, or may be learned by practice of the presented embodiments.

According to one or more embodiments, an application is stored in a computer-readable storage medium to perform a method of providing a video call service, the method including, in a first terminal, establishing a video call session between the first terminal and a second terminal; modulating and displaying an area of an image of a second user, except for an exposure area, the image of the second user being displayed in the first terminal; detecting a predetermined event during the video call session; and controlling a size of the exposure area based on the predetermined event.

According to one or more embodiments, a server for providing a video call service includes a communication interface configured to communicate with a terminal providing the video call service; a storage; a processor; and a memory configured to store instructions executable by the processor, wherein the processor establishes a video call session between a first terminal and a second terminal; modulates and displays an area of an image of a second user, except for an exposure area, the image of the second user being displayed in the first terminal; detects a predetermined event during the video call session; and controls a size of the exposure area based on the predetermined event, by executing the instructions.

According to one or more embodiments, a non-transitory computer-readable storage medium for storing instructions executable by a processor includes instructions for establishing a video call session between a first terminal and a second terminal; instructions for modulating and displaying an area of an image of a second user, except for an exposure area, the image of the second user being displayed on a video call screen of the first terminal; instructions for detecting a predetermined event during the video call session; and instructions for controlling a size of the exposure area based on the predetermined event.

According to one or more embodiments, a user terminal for providing a video call service includes a camera configured to obtain a user image; a communication interface configured to communicate with a server and another user terminal; a processor; and a memory configured to store instructions executable by the processor, wherein the processor establishes a video call session with another user terminal; modulates and displays an area of an image of another user, except for an exposure area, the image of another user being displayed in the user terminal; detects a predetermined event during the video call session; and controls a size of the exposure area based on the predetermined event, by executing the instructions.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
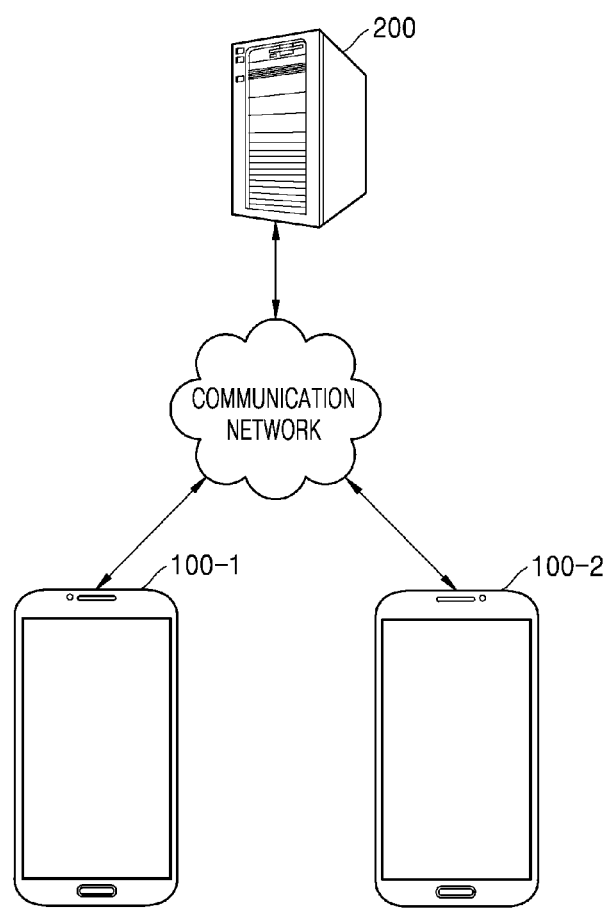
FIG. 1 is a diagram for explaining an environment in which a video call service is provided.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 is a diagram for explaining an environment in which a video call service is provided.

A video call service allows each of a plurality of users to transmit his/her image to the counterpart and receive the counterpart's image using a terminal so that the users may exchange their ideas. Users of the video call service may exchange their images and voices through their terminals and may also exchange text using a chat function. When using the video call service, a user may designate the counterpart directly or using a random or predetermined method in a server providing the video call service.

Referring to FIG. 1, a first terminal 100-1 and a second terminal 100-2 are connected to a server 200, which provides a video call service, through a communication network. The server 200 may store various programs or applications and data, which help a plurality of users to use the video call service through their terminals, e.g., the first terminal 100-1 and the second terminal 100-2. The server 200 providing the video call service may perform both local area communication and remote communication. The server 200 may be connected with a plurality of terminals, e.g., the first terminal 100-1 and the second terminal 100-2, through the communication network. The first and second terminals 100-1 and 100-2 may be various kinds of terminals that may be used for the connection with the server 200 providing the video call service. For example, the first and second terminals 100-1 and 100-2 may be devices, such as wearable devices like smart watches, mobile devices like smartphones, tablet personal computers (PCs), or laptop computers, or stationary devices like desktop computers, which may communicate with the server 200. In addition, the first and second terminals 100-1 and 100-2 may be video calling devices which are capable of shooting and playing a video and support a video call so that users connected through the video call service may make a video call.

In an embodiment, the term "exposure area" refers to an area through which a user watches an image on a terminal when a video call session is established and a video call screen is displayed in the terminal. For example, an exposure area may be a partial area of an image stream of a user, the image stream being displayed on the screen of a terminal. In an embodiment, when the size of an exposure area increases, the range of a user's body shown through a terminal may increase. In other words, a second user may see an image of a first user through only a first exposure area on the screen of a second terminal, and the first user may see an image of the second user through only a second exposure area on the screen of the first terminal.

In an embodiment, the term "non-exposure area" refers to an area of a video call screen displayed in a terminal, except for an exposure area. For example, a non-exposure area of a user image displayed on the screen of a terminal may be represented using a means of concealing an image of a user. The means may be pixelization, shading control, or background insertion. In other words, a user may not see the figure or surroundings of the counterpart in an image corresponding to a non-exposure area. In an embodiment, the sum of the size of an exposure area and the size of a non-exposure area may be equal to the size of an image of the counterpart.

In an embodiment, the term "pinch" refers to a motion of a user's two fingers which respectively move in different directions while being in contact with a screen. A pinch is a gesture of pinching open or close an object or a page. A pinch-open value or a pinch-close value is determined by the distance between two fingers.

Figure 2:
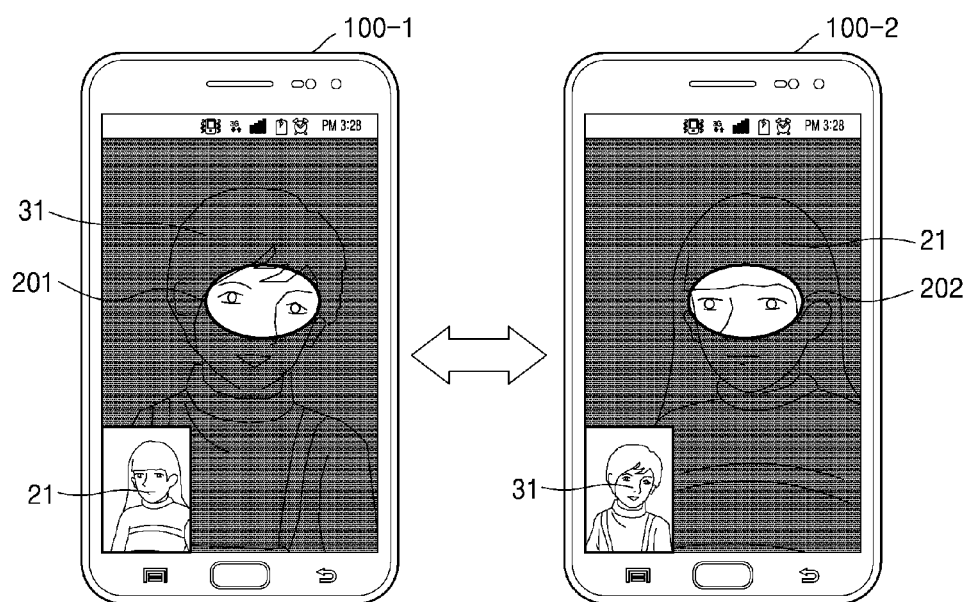
FIG. 2 is a diagram for explaining a state in which a video call service is provided through an exposure area, according to an embodiment.

FIG. 2 is a diagram for explaining a state in which a video call service is provided through an exposure area, according to an embodiment.

In an embodiment, the first terminal 100-1 may display an image stream of a first user 21, which is obtained through a camera, and an image stream of a second user 31, which is received from the second terminal 100-2. In an embodiment, the first user 21 may see only a portion of the image stream of the second user 31 through a second exposure area 201. For example, the first user 21 may see the eyes of the second user 31, which are located in the second exposure area 201. In other words, the second exposure area 201 covers a part of the image of the second user 31 and allows only a portion of the image of the second user 31 to be seen.

Similarly, the second terminal 100-2 may display the image stream of the second user 31 and the image stream of the first user 21, which is received from the first terminal 100-1. At this time, only a portion of an image of the first user 21 may be seen through a first exposure area 202.

Accordingly, the first user 21 and the second user 31 may prevent their faces and surroundings from being involuntarily revealed during a video call.

In an embodiment, the first terminal 100-1 may control an attribute of a voice signal output through the second terminal 100-2 in a video call service. In an embodiment, the first terminal 100-1 may control modulation, silencing, volume, etc. of the voice of the first user 21, thereby controlling the voice of the first user 21, which is output in the second terminal 100-2.

In an embodiment, the first terminal 100-1 may control a voice signal input to the first terminal 100-1. For example, the first terminal 100-1 may control an attribute, such as volume or modulation, of a voice signal input to the first terminal 100-1 and then transmit the voice signal to the second terminal 100-2.

Figure 3:
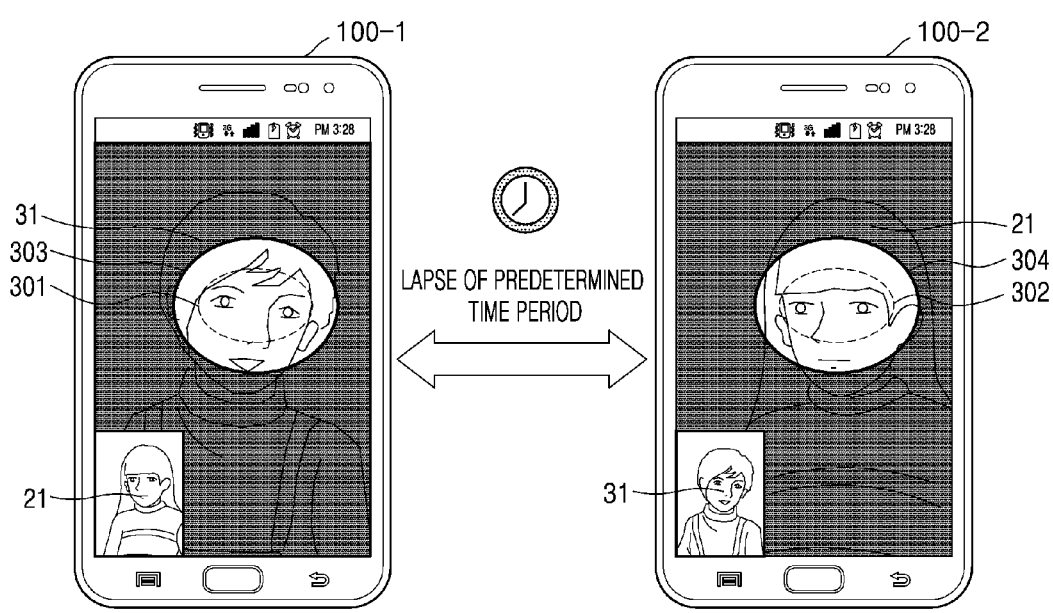
FIG. 3 is a diagram for explaining a state in which the size of an exposure area is controlled after a predetermined time period elapses, according to an embodiment.

FIG. 3 is a diagram for explaining a state in which the size of an exposure area is controlled after a predetermined time period elapses, according to an embodiment.

In an embodiment, the first terminal 100-1 may enlarge the size of a second exposure area 301 as duration of a video call session with the second terminal 100-2 increases. In an embodiment, the first user 21 may see a wider portion of the image of the second user 31 through an enlarged second exposure area 303.

Similarly, when a predetermined time period elapses after a video call session with the first terminal 100-1 is established, the second terminal 100-2 may enlarge a first exposure area 302. In an embodiment, the second user 31 may see the image of the first user 21 through an enlarged first exposure area 304.

In an embodiment, when a predetermined time period elapses after a video call session between the first and second terminals 100-1 and 100-2 is established, the size of an exposure area of the first terminal 100-1 may be simultaneously changed to the same size as the size of an exposure area of the second terminal 100-2. In an embodiment, the size of an exposure area changed when the predetermined time period elapses may be preset by a user or a server administrator.

In an embodiment, the respective exposure areas of the first and second terminals 100-1 and 100-2 may be enlarged step by step as duration of a video call session increases.

Figure 4:
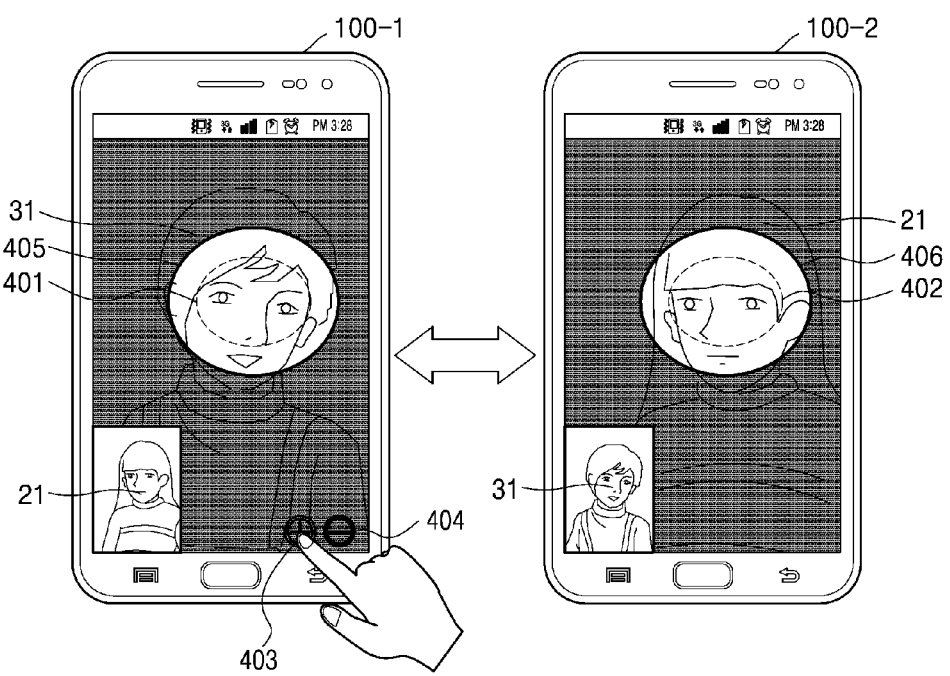
FIG. 4 is a diagram for explaining a state in which the size of an exposure area increases at a user's request for size control of the exposure area, according to an embodiment.

FIG. 4 is a diagram for explaining a state in which the size of an exposure area increases at a user's request for size control of the exposure area, according to an embodiment.

In an embodiment, the first terminal 100-1 may receive an input, which selects an exposure area enlargement control icon 403, from the first user 21. In an embodiment, the first terminal 100-1 may enlarge a second exposure area 401 and output the image of the second user 31 through an enlarged second exposure area 405 in response to the input of the exposure area enlargement control icon 403.

In an embodiment, when the first terminal 100-1 receives an input, which selects the exposure area enlargement control icon 403, from the first user 21, the first terminal 100-1 may transmit a signal for enlarging a first exposure area 402 to the second terminal 100-2. Upon receiving the signal for enlarging the first exposure area 402, the second terminal 100-2 may display an enlarged first exposure area 406. The second user 31 may see the image of the first user 21 through the enlarged first exposure area 406.

In an embodiment, the server 200 may simultaneously control the size of the second exposure area 401 of the first terminal 100-1 and the size of the first exposure area 402 of the second terminal 100-2 in response to an input, which selects the exposure area enlargement control icon 403, from the first user 21.

In an embodiment, the exposure area enlargement control icon 403 may be displayed as a button, an icon, an arrow, or the like. In an embodiment, the exposure area enlargement control icon 403 may be located in a random area of a video call screen.

In an embodiment, when the first user 21 selects an exposure area reduction control icon 404, the size of an exposure area of the first terminal 100-1 and the size of an exposure area of the second terminal 100-2 may be reduced.

Figure 5:
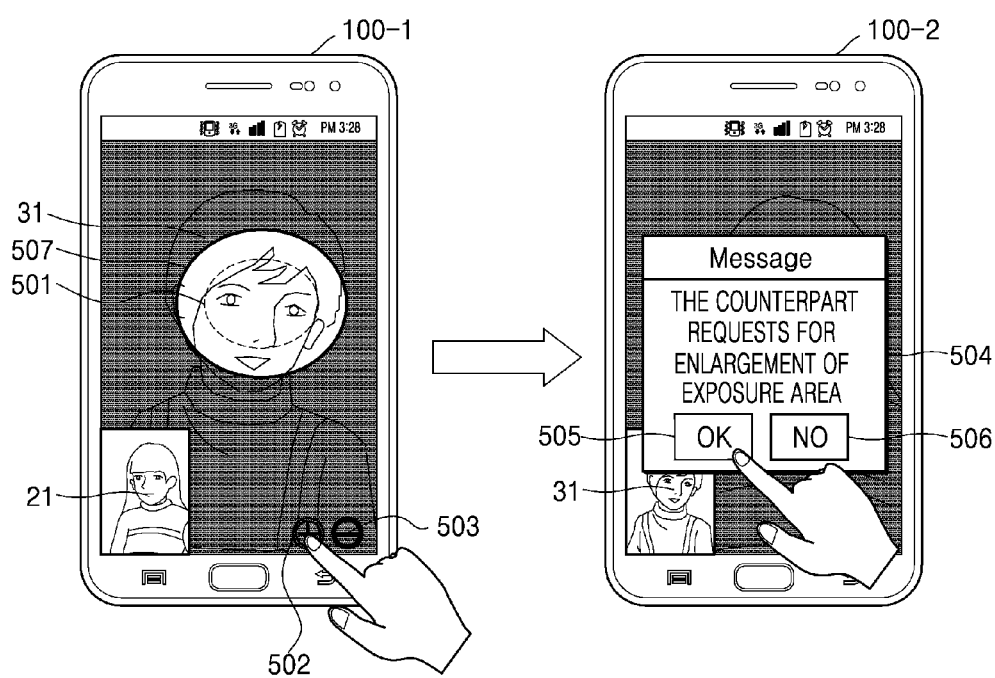
FIG. 5 is a diagram for explaining a video call screen in response to a user's input requesting an increase in the size of an exposure area, according to an embodiment.

FIG. 5 is a diagram for explaining a video call screen in response to a user's input requesting an increase in the size of an exposure area, according to an embodiment.

In an embodiment, an exposure area may be changed according to an enlargement request and acceptance. Accordingly, the exposure area may be prevented from being randomly enlarged when either one of both parties does not want enlargement of the exposure area.

In an embodiment, the first terminal 100-1 may send the second terminal 100-2 a request for enlargement of a second exposure area 501 of the image of the second user 31. In an embodiment, when the first user 21 selects an exposure area enlargement control icon 502, the first terminal 100-1 may send the second terminal 100-2 the request for enlargement of the second exposure area 501. In one or more embodiments, when the first user 21 selects an exposure area reduction control icon 503, the first terminal 100-1 may send the second terminal 100-2 a request for reduction of the second exposure area 501.

In an embodiment, the second terminal 100-2 may display a request message 504 in response to an enlargement request from the first terminal 100-1. In an embodiment, the request message 504 may include content indicating that the first user 21 wants enlargement of the second exposure area 501.

In an embodiment, when the second user 31 selects an OK button 505, the second terminal 100-2 may send the first terminal 100-1 an exposure area enlargement signal. In an embodiment, upon receiving the enlargement signal, the first terminal 100-1 may display an enlarged second exposure area 507. In addition, the second terminal 100-2 may also display an enlarged exposure area.

In an embodiment, when the second user 31 selects a no button 506, the respective exposure areas of the first terminal 100-1 and the second terminal 100-2 are not enlarged.

Figure 6:
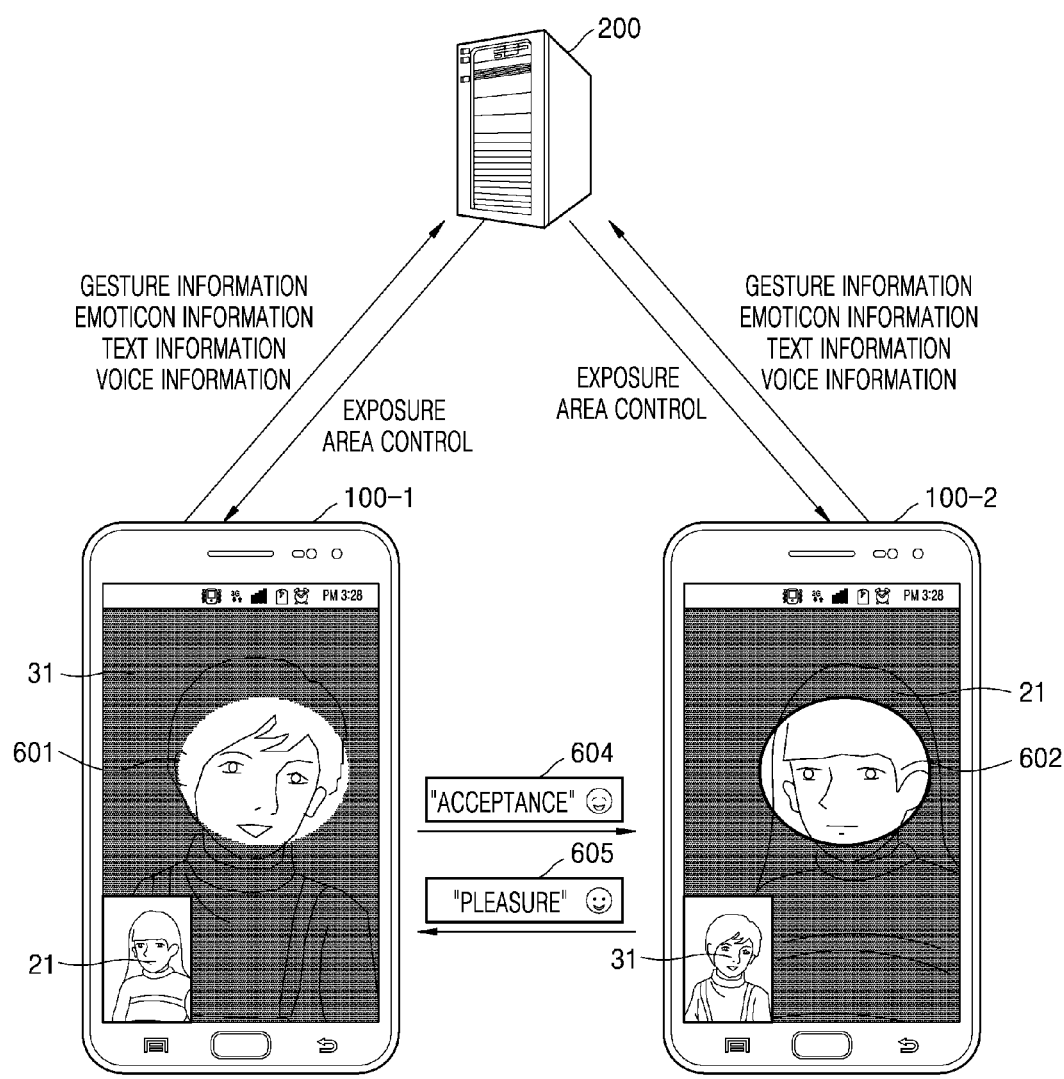
FIG. 6 is a diagram for explaining a state in which the size of an exposure area is controlled based on gesture detection in a terminal, according to an embodiment.

FIG. 6 is a diagram for explaining a state in which the size of an exposure area is controlled based on gesture detection in a terminal, according to an embodiment.

In an embodiment, whether to enlarge the size of an exposure area may be determined from a gesture in a video displayed on each of the first terminal 100-1 and the second terminal 100-2. In an embodiment, when emotion information corresponding to at least one of a gesture of the first user 21 and a gesture of the second user 31 is classified as a positive reaction, the first terminal 100-1 may enlarge the size of a second exposure area 601. At this time, the gesture of the first user 21 is detected from an image of the first user 21 taken by the first terminal 100-1, and the gesture of the second user 31 is detected from an image of the second user 31, which is received from the second terminal 100-2. In the same manner, the second terminal 100-2 may also enlarge the size of a first exposure area 602.

In an embodiment, a gesture refers to nonverbal communication carried out by a user using the face, the hand, the body, or the like. The gesture may be a facial motion, a hand motion, or a body motion. A user may make himself/herself understood or draw a certain reaction from the counterpart by making a gesture. The facial motion is a way of expressing a user's thought by moving the user's eye, eyebrow, nose, mouth, forehead, or cheek. For example, the facial motion may be blinking, closing or opening the eyes wide, turning the mouth corners up, opening the mouth, biting a lip, frowning, or the like. The hand motion is a way of expressing a user's thought by making a predetermined shape or action with a hand. The body motion is a way of expressing a user's thought by making a predetermined shape or action with the body. The hand motion may be an OK sign, thumbs up, thumbs down, a V sign, moving a hand back and forth, or moving a hand from side to side. The body motion may be body twisting, a shrug, or folding the arms.

Meanwhile, when a user makes a gesture, the user expresses himself/herself consciously or unconsciously using the face, the hand, the body, or the like. Accordingly, the gesture may have corresponding emotion information. The emotion information may indicate the user's emotion involved in the gesture or feeling, mood, or expression itself causing the emotion. For example, the emotion information may include joy, happiness, anger, pleasure, pain, sadness, depression, sleepiness, boredom, curiousness, displeasure, satisfaction, smile, laugh, wink, weep, affirmation, denial, acceptance, rejection, or the like.

In addition, the gesture may have corresponding icon information. The icon information may be a picture or a symbol which looks similar to the gesture and intuitively depicts the gesture or indicates emotion information corresponding to the gesture. For example, the icon information may include a picture of a shape or form corresponding to a user's face, hand, or body motion or a symbol or letter representing emotion information.

In an embodiment, the first terminal 100-1 may detect a gesture of the first user 21 and a gesture of the second user 31 and determine whether emotion information corresponding to each gesture is positive information.

In an embodiment, whether emotion information corresponding to a gesture is positive information or negative information may be obtained using an artificial intelligence (AI) learning model. In an embodiment, whether emotion information corresponding to a user's gesture is positive may be determined using an AI learning model, which is obtained from a result of learning relationships between gestures and emotion information based on information on communication between the user and another user.

In an embodiment, the first terminal 100-1 may use a learning model according to deep neural network technology to determine whether emotion information corresponding to a gesture is positive.

In an embodiment, when the first terminal 100-1 determines that the first user 21 and the second user 31 are laughing based on facial features such as the eyes, the nose, and the mouth of each of the first and second users 21 and 31, the first terminal 100-1 may determine that emotion information corresponding to a gesture, i.e., "laugh", is positive. Accordingly, the first terminal 100-1 may determine that communication between the first user 21 and the second user 31 is positive and enlarge the size of the second exposure area 601 based on the determination. In addition, the second terminal 100-2 may also enlarge the size of the first exposure area 602.

In an embodiment, the first terminal 100-1 may detect communication information transmitted to and received from the second terminal 100-2 and determine emotion information corresponding to the communication information. In an embodiment, the communication information may include at least one of gesture information, emoticon information, text information, and voice information.

In an embodiment, when first communication information 604 including text and emoticon information transmitted to the second terminal 100-2 and second communication information 605 including text and emoticon information received from the second terminal 100-2 respectively correspond to "acceptance" and "pleasure", the first terminal 100-1 may determine that emotion information is positive. Accordingly, the first terminal 100-1 may determine that communication between the first user 21 and the second user 31 is positive and enlarge the size of the second exposure area 601 based on the determination. In addition, the second terminal 100-2 may also enlarge the size of the first exposure area 602 based on the same determination.

In an embodiment, when an action of adding the second user 31 as a friend is detected in the first terminal 100-1 and when an action of adding the first user 21 as a friend in the second terminal 100-2 is detected, the first terminal 100-1 may determine that communication between the first user 21 and the second user 31 is positive. In an embodiment, the first terminal 100-1 may enlarge the size of the second exposure area 601.

In one or more embodiments, when the first terminal 100-1 determines that communication between the first user 21 and the second user 31 is negative, the first terminal 100-1 may reduce the size of the second exposure area 601.

In addition, the second terminal 100-2 may reduce the size of the first exposure area 602 based on the same determination.

In an embodiment, the first terminal 100-1 may send the server 200 voice information, gesture information, emoticon information, and text information, which are detected from the image of the first user 21 and the image of the second user 31. In addition, the second terminal 100-2 may also send the server 200 voice information, gesture information, emoticon information, and text information, which are detected from the image of the second user 31 and the image of the first user 21.

In an embodiment, the server 200 may send a signal for controlling the size of an exposure area of each of the first and second terminals 100-1 and 100-2 based on voice information, gesture information, emoticon information, and text information, which are received from the first and second terminals 100-1 and 100-2. In an embodiment, when the server 200 determines that communication between the first user 21 and the second user 31 is positive, the server 200 may send a control signal for enlarging the size of the exposure area. When the server 200 determines that the communication between the first user 21 and the second user 31 is negative, the server 200 may send a control signal for reducing the size of the exposure area.

Figure 7:
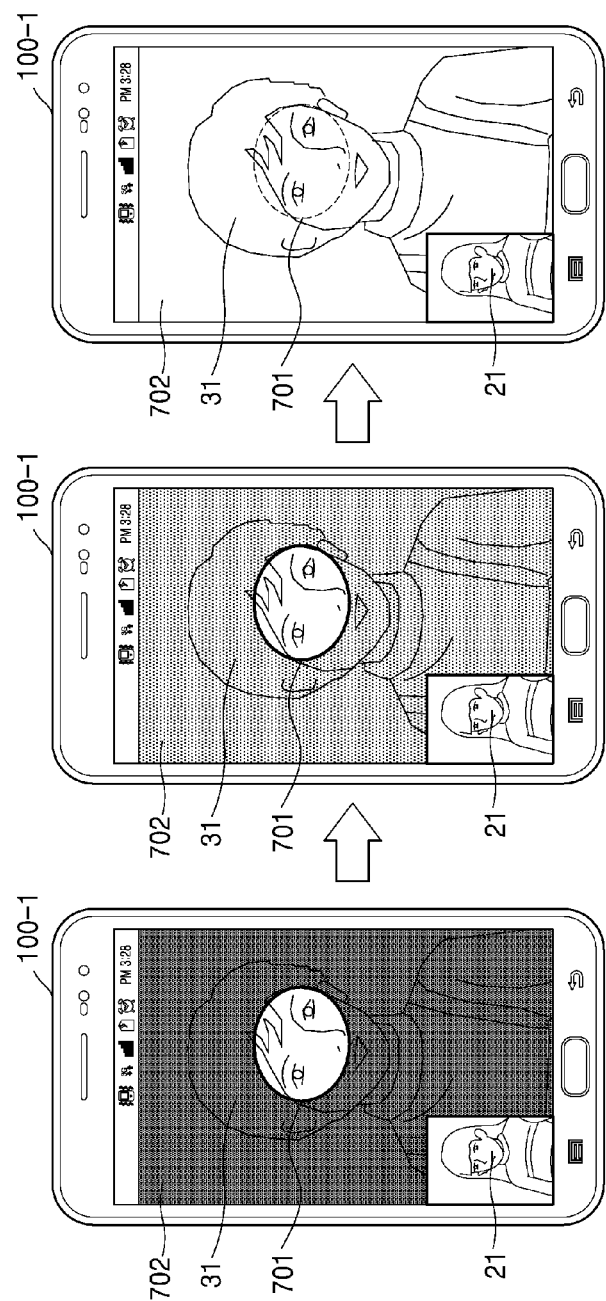
FIGS. 7A through 7C are diagrams for explaining changes in an attribute of a non-exposure area over time, according to an embodiment.

FIGS. 7A through 7C are diagrams for explaining changes in an attribute of a non-exposure area over time, according to an embodiment.

In an embodiment, as duration of a video call with the second terminal 100-2 increases, the first terminal 100-1 may change an attribute of a second non-exposure area 702, i.e., a screen area, except for a second exposure area 701.

In an embodiment, FIGS. 7A through 7C are arranged according to the flow of time. In an embodiment, as video call duration increases, the first terminal 100-1 may display the image of the second user 31 in a wider area.

In an embodiment, when a video call is established, the second non-exposure area 702 may be modulated and displayed so that a body part and surroundings of the second user 31 may not be shown, excluding the second exposure area 701, as shown in FIG. 7A. For example, the second non-exposure area 702 may be processed using pixelization, modulation, or background insertion, thereby hindering the first user 21 from watching an image of the second user 31, excluding a portion of the image shown through the second exposure area 701. In an embodiment, the sum of the size of the second exposure area 701 and the size of the second non-exposure area 702 is equal to the size of the image of the second user 31. In other words, the second non-exposure area 702 refers to the image of the second user 31 excluding the second exposure area 701.

In an embodiment, after a predetermined video call duration elapses, the first terminal 100-1 may decrease the modulation of the second non-exposure area 702, as shown in FIG. 7B. For example, chroma, density, or brightness of the second non-exposure area 702 may be controlled to allow the image of the second user 31 to be shown more clearly as compared to FIG. 7A.

In an embodiment, after another predetermined video call duration elapses, the first terminal 100-1 may eliminate the modulation of the second non-exposure area 702, as shown in FIG. 7C. In an embodiment, after a predetermined video call duration elapses, the second exposure area 701 and the second non-exposure area 702 may disappear and a whole image of the second user 31 may be displayed in the first terminal 100-1. At this time, the border of the second exposure area 701 may be marked with a dashed line or may fade away.

Changes in a non-exposure area over time have been described with reference to FIGS. 7A through 7C, according to an embodiment, but the changes may also be applied to event detection in one or more embodiments.

Figure 8:
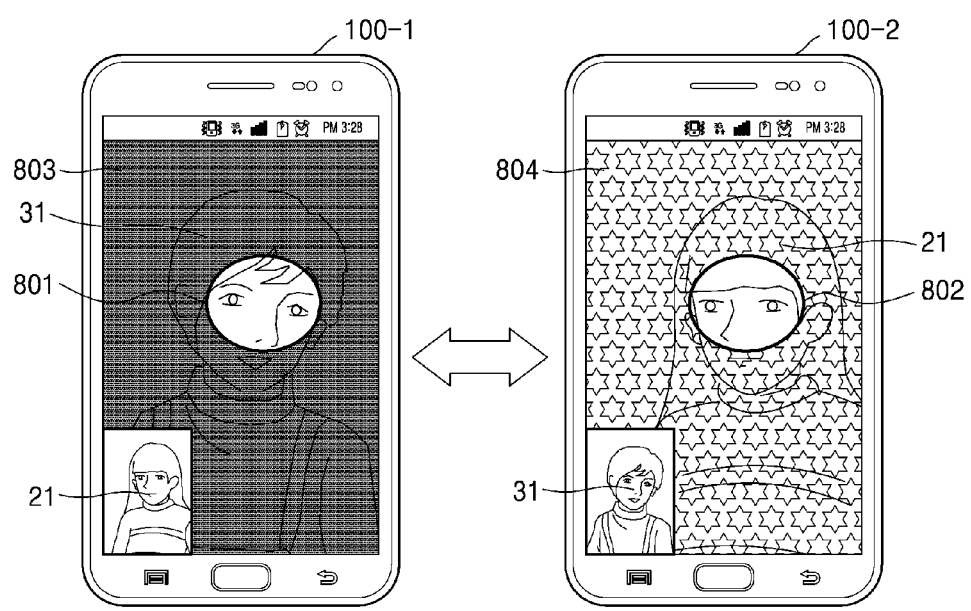
FIG. 8 is a diagram for explaining a state in which an attribute of a non-exposure area is changed in response to a user's selection, according to an embodiment.

FIG. 8 is a diagram for explaining a state in which an attribute of a non-exposure area is changed in response to a user's selection, according to an embodiment.

In an embodiment, the first user 21 of the first terminal 100-1 may change an attribute of a first non-exposure area 804 of the image of the first user 21, which is displayed in the second terminal 100-2. For example, the first user 21 may insert a background image or a random photo or change a background color in the first non-exposure area 804.

In an embodiment, the first user 21 may change the attribute of the first non-exposure area 804 of the second terminal 100-2 through a control menu.

In the same manner, the second user 31 of the second terminal 100-2 may also change an attribute of a second non-exposure area 803 of the image of the second user 31, which is displayed in the first terminal 100-1.

Figure 9:
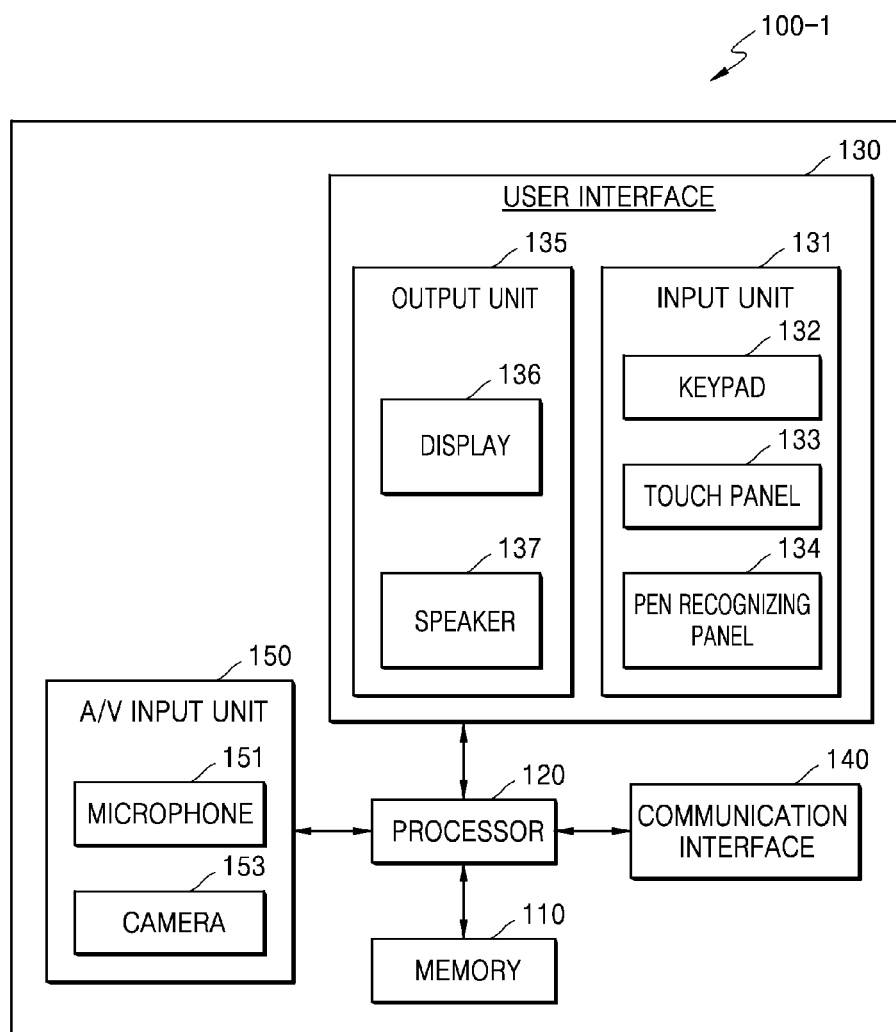
FIG. 9 is a block diagram of the configuration of a terminal according to an embodiment.

FIG. 9 is a block diagram of the configuration of a terminal according to an embodiment.

Although FIG. 9 shows the first terminal 100-1, the second terminal 100-2 may also include the same structure as the first terminal 100-1 of FIG. 9.

Referring to FIG. 9, the first terminal 100-1 may include a memory 110, a processor 120, a user interface 130, a communication interface 140, and an audio/video (A/V) input unit 150. It will be understood by those of ordinary skill in the art that other universal elements apart from elements shown in FIG. 9 may also be included in the first terminal 100-1.

The memory 110 may store a program or software. For instance, the memory 110 may store an application, a program such as application programming interface (API), and various kinds of data. The memory 110 may store instructions executable by the processor 120.

The processor 120 may execute the instructions stored in the memory 110. The processor 120 may use various kinds of programs, content, and data stored in the memory 110 or may store a new program, new content, or new data in the memory 110.

The processor 120 may access the memory 110 and perform booting using an operating system (OS) stored in the memory 110. The processor 120 may perform various operations using various kinds of programs, content, and data stored in the memory 110. For example, the processor 120 may display a predetermined screen on a display 136 using the various kinds of programs, content, and data stored in the memory 110. When a user's handling is performed on a portion of the display 136, the processor 120 may perform a control operation corresponding to the user's handling.

The processor 120 may include a graphics processing unit (GPU) specialized in graphics processing. When booting of the first terminal 100-1 is completed, the GPU displays a user interface screen in an area of the display 136. In detail, the GPU may generate a screen, which displays a video call layout including various objects such as content, an icon, a menu, etc. The GPU may calculate attribute values, such as a value of coordinates at which each object will be displayed and a shape, size, and color of the object, based on the video call layout on the generated screen. The GPU may generate a screen of various layouts including the object based on the calculated attribute values. The screen generated by the GPU may be provided to and displayed in the display 136.

Meanwhile, the processor 120 may include a video processor and an audio processor. The processor 120 may control the video processor and the audio processor to respectively process video data and audio data, which are included in an image stream received through the communication interface 140 or an image stream stored in the memory 110.

The user interface 130 may include an input unit 131 and an output unit 135.

The input unit 131 may receive various instructions from a user. The input unit 131 may include at least one of a keypad 132, a touch panel 133, and a pen recognizing panel 134.

The keypad 132 may include various types of keys, such as mechanical buttons and wheels, which are formed in various regions such as exterior front, side, and back portions of a main body of the first terminal 100-1.

The touch panel 133 may sense a user's touch input and output a touch event value corresponding to a sensed touch signal. When the touch panel 133 is combined with a display panel to form a touch screen, the touch screen may be implemented as any one of various kinds of touch sensors such as a capacitive touch sensor, a resistive touch sensor, and a piezoelectric touch sensor.

The pen recognizing panel 134 may sense a proximity input or a touch input of a touch pen (e.g., a stylus pen) according to a user's operation of the touch pen and may output a sensed pen proximity event or a sensed pen touch event. The pen recognizing panel 134 may be implemented using, for example, an electromagnetic resonance (EMR) method and may sense a proximity or touch input according to a variation of electromagnetic field intensity by proximity or touch of a touch pen. The pen recognizing panel 134 may include an electromagnetic induction coil sensor having a grid structure and an electromagnetic signal processor that sequentially provides an alternating current (AC) signal having a predetermined frequency to loop coils of the electromagnetic induction coil sensor.

The output unit 135 may include the display 136 and a speaker 137.

The display 136 may include a display panel and a controller that controls the display panel. The display panel may be implemented as any one of various panels such as a liquid crystal display (LCD) panel, an organic light emitting diode (OLED) display panel, an active-matrix OLED (AMOLED) display panel, and a plasma display panel (PDP). The display panel may be flexible or wearable. The display 136 may be combined with the touch panel 133 of the input unit 131, thereby providing a touch screen.

The speaker 137 may output sound based on audio data. For example, the speaker 137 may output a user's voice according to audio data included in an image stream.

The communication interface 140 may communicate with various types of external devices according to various types of communication methods. The communication interface 140 may include at least one of a Wi-Fi chip, a Bluetooth chip, a near field communication (NFC) chip, and a wireless communication chip. The processor 120 may communicate with various types of external devices via the communication interface 140.

The Wi-Fi chip may perform communication in a Wi-Fi mode, and the Bluetooth chip may perform communication in a Bluetooth mode. When the Wi-Fi chip or the Bluetooth chip is used, various kinds of connection information, such as a service set identifier (SSID) and a session key, may be exchanged first, and then communication may be connected using the connection information. Thereafter, various kinds of information may be exchanged. The NFC chip operates in an NFC mode using a frequency band of 13.56 MHz among various radio frequency identification (RFID) frequency bands. The wireless communication chip performs communication according to various communication protocols such as Institute of Electrical and Electronics Engineers (IEEE), Zigbee, third generation (3G), 3G partnership project (3GPP), long term evolution (LTE), and fifth generation (5G).

The A/V input unit 150 may include a microphone 151 and a camera 153. The microphone 151 may receive and convert a user's voice or other sound into audio data. The processor 120 may use the user's voice, which is input through the microphone 151, for a video call or may convert the user's voice into audio data and store the audio data in the memory 110. The camera 153 may shoot a still image or a moving image under a user's control. The camera 153 may be a camera module located on the front or back of the first terminal 100-1. The processor 120 may generate an image stream for a video call, using sound input through the microphone 151 and images shot by the camera 153.

Meanwhile, the first terminal 100-1 may operate in a motion control mode or an audio control mode. In the motion control mode, the processor 120 may activate the camera 153 to shoot a user and may track a change in the user's motion and perform a control operation corresponding to the change. In the audio control mode, the processor 120 may analyze a user's voice input through the microphone 151 and perform a control operation according to the analysis result.

The names of elements of the first terminal 100-1 described above may be changed. In addition, the first terminal 100-1 may include at least one of the elements described above and may not include some of the elements or further include other additional elements. The first terminal 100-1 may operate, as described below, using at least one of the elements described above.

Figure 10:
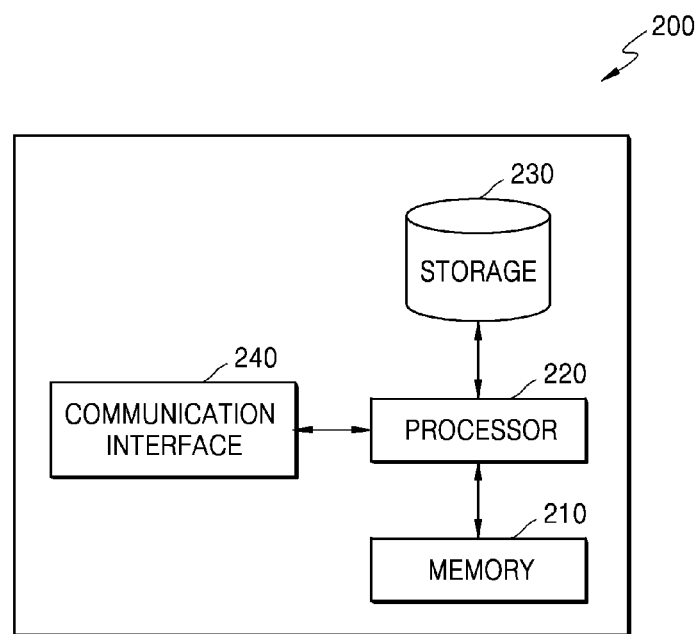
FIG. 10 is a block diagram of the configuration of a server that provides a video call service, according to an embodiment.

FIG. 10 is a block diagram of the configuration of a server that provides a video call service, according to an embodiment.

Referring to FIG. 10, the server 200 that provides a video call service may include a memory 210, a processor 220, a storage 230, and a communication interface 240. It will be understood by those of ordinary skill in the art that other universal elements apart from elements shown in FIG. 10 may also be included in the server 200. Each element shown in FIG. 10 may be separated, added, or omitted according to a method of implementing the server 200. In other words, according to the implementation method, a single element may be subdivided into at least two elements, at least two elements may be combined into a single element, or some elements may be added or removed.

The memory 210 may store instructions executable by the processor 220. The memory 210 may store a program or software.

The processor 220 may execute the instructions stored in the memory 210. The processor 220 may control all operations of the server 200 that provides a video call service. The processor 220 may obtain information and a request, which are received via the communication interface 240, and may store the information in the storage 230. The processor 220 may also process the information. For example, the processor 220 may generate information, which is used for a video call service, from information received from a terminal, e.g., the first terminal 100-1 or the second terminal 100-2, or may process the received information for management and store the processed information in the storage 230. The processor 220 may also transmit information for providing a video call service to a terminal via the communication interface 240 using information stored in the storage 230 in response to a request obtained from the terminal.

The storage 230 may store various kinds of software and information, which are required when the server 200 provides a video call service. For example, the storage 230 may store programs and applications, which are executed by the server 200 that provides a video call service, and various kinds of data used for the video call service.

The storage 230 may store and manage personal information of video call service users in a database. The storage 230 may store users' personal information and various kinds of information, which is used for a video call service, by accounts used to access the server 200 that provides the video call service.

The communication interface 240 may communicate with external devices including a terminal, e.g., the first terminal 100-1 or the second terminal 100-2. For example, the server 200 that provides the video call service may receive a video call service initiation request or a request for configuration information for setting a video call service environment from the terminal and may provide all items involved in the video call service in response to the request.

Figure 11:
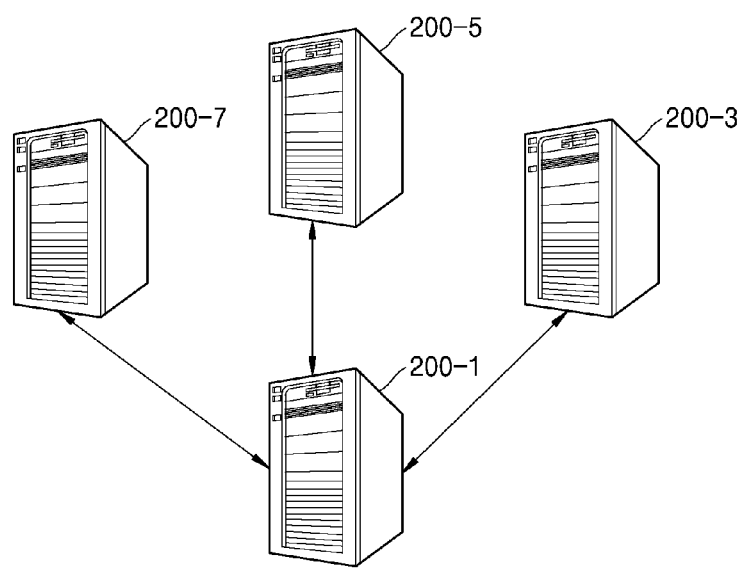
FIG. 11 is a diagram for explaining a state in which a server that provides a video call service is implemented by a plurality of distributed servers, according to another embodiment.

FIG. 11 is a diagram for explaining a state in which a server that provides a video call service is implemented by a plurality of distributed servers, according to an embodiment.

FIG. 11 is a diagram for explaining a state in which the server 200 that provides a video call service is implemented by a plurality of distributed servers, according to another embodiment. The descriptions made about the server 200 above may be applied below if omitted.

Referring to FIG. 11, the distributed servers that provide a video call service may include a load balancing server 200-1 and functional servers 200-3, 200-5, and 200-7 that provide the video call service. When there is a video call service request of an external device such as a terminal, the load balancing server 200-1 may select and connect any one of the functional servers 200-3, 200-5, and 200-7 to the terminal or may monitor the status of the functional servers 200-3, 200-5, and 200-7 and select and connect an optimal one of the functional servers 200-3, 200-5, and 200-7 to the terminal.

Figure 12:
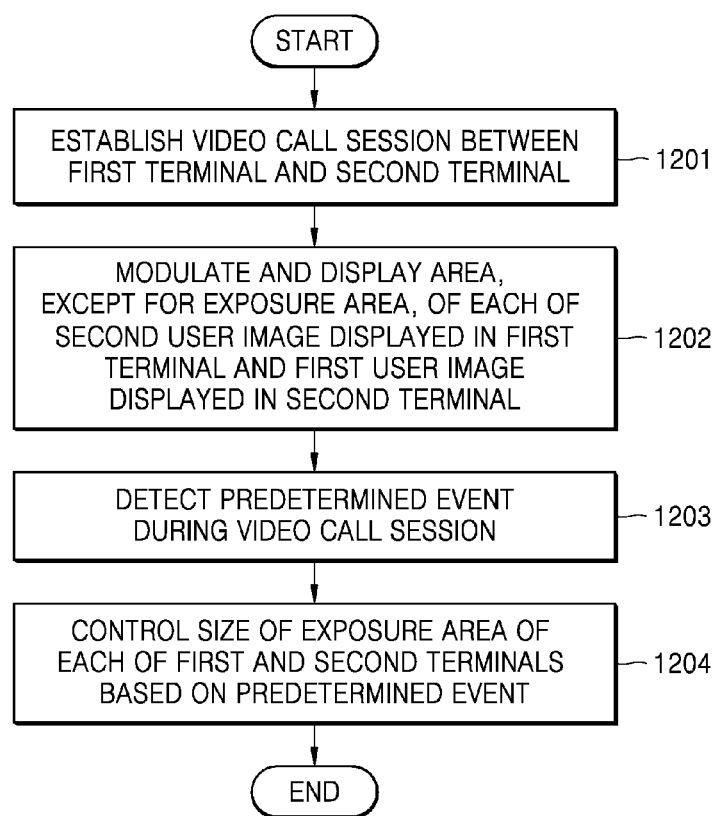
FIG. 12 is a flowchart of a method of providing a video call service through an exposure area, according to an embodiment.

FIG. 12 is a flowchart of a method of providing a video call service through an exposure area, according to an embodiment.

The server 200 may establish a video call session between the first terminal 100-1 and the second terminal 100-2 in operation 1201. In an embodiment, the server 200 may receive a first image stream of the first user 21 from the first terminal 100-1 and transmit the first image stream to the second terminal 100-2. In an embodiment, the server 200 may receive a second image stream of the second user 31 from the second terminal 100-2 and transmit the second image stream to the first terminal 100-1.

The server 200 may modulate and display an area of each of a second user image and a first user image, except for an exposure area, in operation 1202, the second user image being displayed on a video call screen of the first terminal 100-1 and the first user image being displayed on a video call screen of the second terminal 100-2. When transmitting an image of the second user 31 to the first terminal 100-1, the server 200 may modulate an area of the image of the second user 31, except for an exposure area, so that an image in the modulated area may not be recognized. In addition, the server 200 may transmit the first user image, which has been modulated in the area except for the exposure area, to the second terminal 100-2.

The server 200 may detect a predetermined event during the video call session in operation 1203. The predetermined event may be any one of duration of the video call session between the first terminal 100-1 and the second terminal 100-2, selection of an exposure area control icon, a user input requesting for exposure area control, an add-friend event, a gesture detected in the image, text information, a voice signal, and emoticon information, the text information, the voice signal, and emoticon information being used during video call.

The server 200 may control the size of the exposure area of each of the first terminal 100-1 and the second terminal 100-2 based on the predetermined event in operation 1204. In an embodiment, the server 200 may simultaneously control the exposure area in both the first terminal 100-1 and the second terminal 100-2.

Meanwhile, embodiments of a method of providing a video call service may be provided as applications stored in a computer-readable storage medium to enable the first terminal 100-1 or the second terminal 100-2 to perform the method, the first and second terminals 100-1 and 100-2 providing the video call service. In other words, the embodiments may be provided as applications or computer programs which are stored in a computer-readable storage medium to enable the first terminal 100-1 or the second terminal 100-2 to execute each stage in the method.

The embodiments may be embodied as computer-readable storage media that store data or instructions executable by a computer or a processor. At least one of the data and the instructions may be stored as program code. When the program code is executed by a processor, a predetermined program module may be generated and a predetermined operation may be performed. The computer-readable storage media may be read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid state disks (SSDs), or any devices that can store an instruction or software, relevant data, a data file, and a data structure and can provide the instruction or software, the relevant data, the data file, and the data structure to a processor or a computer to allow the processor or computer to execute the instruction.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An application stored in a computer-readable storage medium to perform a method of providing a video call service, the method comprising:
    in a first terminal,
    establishing a video call session between the first terminal and a second terminal;
    modulating and displaying an area of an image of a second user, except for an exposure area, the image of the second user being displayed in the first terminal;
    detecting a predetermined event during the video call session; and
    controlling a size of the exposure area based on the predetermined event,
    wherein the controlling of the size of the exposure area comprises controlling the size of the exposure area when emotion information corresponding to at least one of a gesture of a first user being detected in a first image of the first user and a gesture of the second user being detected in a second image of the second user is classified as a positive reaction.

2. The application of claim 1, wherein the method further comprises transmitting a signal for controlling an exposure area of an image of the first user to the second terminal, the image of the first user being displayed on a video call screen of the second terminal.

3. The application of claim 1, wherein the method further comprises changing an attribute of the area except for the exposure area based on the detecting of the predetermined event.

4. The application of claim 1, wherein the method further comprises changing an attribute of at least one of a voice signal received by the first terminal and a voice signal transmitted to the second terminal, based on the detecting of the predetermined event.

5. A server for providing a video call service, the server comprising:
    a communication interface configured to communicate with a terminal providing the video call service;
    a processor; and
    a memory configured to store instructions executable by the processor,
    wherein the processor establishes a video call session between a first terminal and a second terminal; modulates an area of an image of a second user, except for an exposure area, the image of the second user being displayed on a video call screen of the first terminal; detects a predetermined event during the video call session; and controls a size of the exposure area based on the predetermined event, by executing the instructions,
    wherein the processor controls the size of the exposure area when emotion information corresponding to at least one of a gesture of a first user being detected in a first image of the first user and a gesture of the second user being detected in a second image of the second user is classified as a positive reaction.

6. A non-transitory computer-readable storage medium for storing instructions executable by a processor, the non-transitory computer-readable storage medium comprising:
    instructions for establishing a video call session between a first terminal and a second terminal;
    instructions for modulating and displaying an area of an image of a second user, except for an exposure area, the image of the second user being displayed on a video call screen of the first terminal;
    instructions for detecting a predetermined event during the video call session; and
    instructions for controlling a size of the exposure area based on the predetermined event,
    wherein the instructions for controlling of the size of the exposure area comprises controlling the size of the exposure area when emotion information corresponding to at least one of a gesture of a first user being detected in a first image of the first user and a gesture of the second user being detected in a second image of the second user is classified as a positive reaction.

* * * * *